US012511026B2

(12) United States Patent
Unnikrishnan et al.

(10) Patent No.: US 12,511,026 B2
(45) Date of Patent: *Dec. 30, 2025

(54) INTEGRATING MAPS AND STREET VIEWS

(71) Applicant: Google LLC, Mountain View, CA (US)

(72) Inventors: Sreejit Unnikrishnan, Bangalore (IN); Arijit De, Bangalore (IN); Vihari Venkata Komaragiri, Bangalore (IN); Lalitesh Kumar Katragadda, Bangalore (IN)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/493,537

(22) Filed: Oct. 24, 2023

(65) Prior Publication Data
US 2024/0053876 A1 Feb. 15, 2024

Related U.S. Application Data

(63) Continuation of application No. 17/474,790, filed on Sep. 14, 2021, now Pat. No. 11,829,592, which is a
(Continued)

(30) Foreign Application Priority Data

Apr. 12, 2011 (IN) .......................... 1287/CHE/2011

(51) Int. Cl.
G06F 3/048 (2013.01)
G01C 21/26 (2006.01)
(Continued)

(52) U.S. Cl.
CPC ......... G06F 3/04845 (2013.01); G01C 21/26 (2013.01); G01C 21/3664 (2013.01);
(Continued)

(58) Field of Classification Search
None
See application file for complete search history.

(56) References Cited

U.S. PATENT DOCUMENTS 7,827,507 B2 * 11/2010 Geise ..................... G01C 21/36
715/848
7,945,546 B2 * 5/2011 Bliss ................... H04M 1/0206
707/758
(Continued)

FOREIGN PATENT DOCUMENTS

EP 2270767 1/2011
KR 2010/0082050 7/2010

OTHER PUBLICATIONS

Extended European Search Report for European Patent Application No. EP12781886.2, Feb. 5, 2015, 7 pages.
(Continued)

Primary Examiner — Hua Lu
(74) Attorney, Agent, or Firm — DORITY & MANNING P.A.

(57) ABSTRACT

Methods and systems for improved integration of an overhead representation (e.g., a map) with a street view representation. A user interface with at least two regions is output for display to a user. One region includes an overhead representation of an area and an interactive control overlaid onto the overhead representation. Another region includes a street view perspective that has a point of view corresponding to a position and directional orientation of the interactive control. Information about a user input that adjusts the interactive control is received and the street view perspective is updated to track the control as it is adjusted. The field of view of the street view perspective may be reflected in the appearance of the interactive control. Additionally, the street
(Continued)

view perspective may follow the location of a marker as it is moved around the overhead representation.

18 Claims, 6 Drawing Sheets

Related U.S. Application Data continuation of application No. 16/443,066, filed on Jun. 17, 2019, now abandoned, which is a continuation of application No. 15/008,156, filed on Jan. 27, 2016, now Pat. No. 10,324,601, which is a continuation of application No. 14/110,705, filed as application No. PCT/US2012/032941 on Apr. 10, 2012, now Pat. No. 9,280,272.

(51) Int. Cl.
| | | |
|---|---|---|
| *G01C 21/36* | (2006.01) | |
| *G06F 3/04815* | (2022.01) | |
| *G06F 3/04845* | (2022.01) | |
| *G06F 3/04847* | (2022.01) | |
| *G06F 3/0485* | (2022.01) | |
| *G06T 3/00* | (2006.01) | |
| *G09B 29/00* | (2006.01) | |

(52) U.S. Cl.
CPC ...... *G06F 3/04815* (2013.01); *G06F 3/04847* (2013.01); *G06F 3/0485* (2013.01); *G06T 3/00* (2013.01); *G09B 29/007* (2013.01); *G01C 21/3647* (2013.01); *G01C 21/367* (2013.01); *G06F 2203/04803* (2013.01)

(56) References Cited

U.S. PATENT DOCUMENTS

| | | | | | |
|---|---|---|---|---|---|
| 8,098,894 | B2* | 1/2012 | Soderstrom | ......... | G06F 16/9537 |
| | | | | | 701/484 |
| 8,423,293 | B2* | 4/2013 | Kondo | .................. | G06F 3/0481 |
| | | | | | 715/850 |
| 2004/0075697 | A1* | 4/2004 | Maudlin | .................. | G06F 16/29 |
| | | | | | 715/848 |
| 2005/0216186 | A1* | 9/2005 | Dorfman | .............. | G09B 29/106 |
| | | | | | 701/408 |
| 2006/0271284 | A1* | 11/2006 | Watanabe | ............ | G01C 21/367 |
| | | | | | 701/431 |
| 2008/0091338 | A1* | 4/2008 | Uehira | .................. | G01C 21/365 |
| | | | | | 345/9 |
| 2008/0228386 | A1* | 9/2008 | Geelen | ............... | G01C 21/3682 |
| | | | | | 701/533 |
| 2008/0291217 | A1* | 11/2008 | Vincent | ............... | G06F 3/04815 |
| | | | | | 345/629 |
| 2009/0076719 | A1* | 3/2009 | Geise | ..................... | G01C 21/36 |
| | | | | | 715/850 |
| 2009/0276151 | A1* | 11/2009 | Bucchieri | .......... | G01C 21/3647 |
| | | | | | 701/423 |
| 2009/0316951 | A1* | 12/2009 | Soderstrom | ......... | G06F 16/9537 |
| | | | | | 382/103 |
| 2010/0114972 | A1* | 5/2010 | Imler | ...................... | G06F 16/29 |
| | | | | | 707/E17.108 |
| 2010/0123737 | A1* | 5/2010 | Williamson | ............ | G06T 15/20 |
| | | | | | 345/672 |
| 2010/0231581 | A1* | 9/2010 | Shroads | .................. | G06T 15/10 |
| | | | | | 345/441 |
| 2010/0250109 | A1* | 9/2010 | Johnston | ............ | G06Q 30/0261 |
| | | | | | 715/848 |
| 2010/0293173 | A1* | 11/2010 | Chapin | ............... | G06F 16/9537 |
| | | | | | 707/769 |
| 2010/0302236 | A1* | 12/2010 | Kinnan | .................. | G06T 17/05 |
| | | | | | 345/419 |
| 2011/0010674 | A1* | 1/2011 | Knize | ..................... | G01C 21/20 |
| | | | | | 715/849 |
| 2011/0320116 | A1* | 12/2011 | DeMaio | ............ | G01C 21/3638 |
| | | | | | 701/457 |
| 2012/0022787 | A1* | 1/2012 | LeBeau | .................. | G06F 16/638 |
| | | | | | 701/527 |
| 2012/0259545 | A1* | 10/2012 | Mitchell | ................ | G08G 1/202 |
| | | | | | 701/527 |
| 2013/0182108 | A1* | 7/2013 | Meadow | .................. | G06T 17/05 |
| | | | | | 348/143 |

OTHER PUBLICATIONS

Google, "Street View on Google Maps", Nov. 25, 2008, http://www.youtube.com/watch?v=f0y-q-pI2pQ, retrieved on Oct. 3, 2019, 1 page.
Google Earth, "Learn Google Earth: Street View", Nov. 22, 2010, https://www.youtube.com/watch?v=p5cCccXPsvE, retrieved on Oct. 3, 2019, 1 pages.
International Search Report and Written Opinion for Application No. PCT/US2012/032941, mailed Jan. 2, 2013, 8 pages.
International Preliminary Report on Patentability for Application No. PCT/US2012/032941, mailed Oct. 15, 2013, 6 pages.

\* cited by examiner

INTEGRATING MAPS AND STREET VIEWS

PRIORITY CLAIM

This application is a continuation of U.S. application Ser. No. 17/474,790, filed on Sep. 14, 2021, which is a continuation of U.S. application Ser. No. 16/443,066, filed Jun. 17, 2019, which is a continuation of U.S. application Ser. No. 15/008,156, filed Jan. 27, 2016, which is a continuation of U.S. application Ser. No. 14/110,705, filed on Oct. 8, 2013, which is based upon and claims the right of priority under 35 U.S.C. § 371 to International Application No. PCT/US2012/032941 filed on Apr. 10, 2012, which claims priority under 35 U.S.C. § 119 from Indian Patent Application No. 1287/CHE/2011, entitled "Integrated Maps and Street Views," filed on Apr. 12, 2011, all of which are incorporated by reference herein in their entirety for all purposes.

FIELD OF THE DISCLOSURE

Described embodiments relate generally to digital maps, and more specifically to integrating digital maps with street views.

BACKGROUND

Digital maps are used by a wide variety of devices, including car navigation systems, hand-held GPS units and mobile phones, and are also used by many websites. Most devices display digital maps using some form of an overhead view, such as a cylindrical projection (e.g., Mercator), or a "bird's eye" view, providing an overhead view with perspective. Recently, some websites, such as GOOGLE MAPS, have added "street view" features to their maps. A street view is a visualization from a point of view that is near ground level (e.g., from a camera mounted on top of a vehicle). The street view may be generated from photographs taken at many different locations throughout the world, generated using three-dimensional graphics, or a combination thereof. A street level view provides a first-person type perspective of the world that is not otherwise available from an overhead view of a map. However, navigating through a street level view can be a slow and disorienting experience that prevents users from making efficient use of the additional information that is available in the street views.

SUMMARY

Described embodiments provide methods and systems for integrating an overhead representation of an area (e.g., a street map) with a street view perspective of the area. In one embodiment, a user interface has at least two regions that are output for display. An overhead representation of an area is displayed in a first region of the interface display. For example, the overhead representation may be a street map. The first region of the user interface display also includes an interactive control that has a position and a directional orientation in the overhead representation. A street view perspective of the area is displayed in a second region of the user interface display concurrently with the first region. The interactive control is synchronized with the street view perspective such that the point of view shown in the street view perspective corresponds to the position and directional orientation of the interactive control. Information about a user input that adjusts (e.g., by rotating, dragging, or tilting) the interactive control is received. In response, the street view perspective is updated to track the orientation or position of the control as it changes.

In some embodiments, the field of view of the street view perspective is reflected in the appearance of the interactive control. For example, the field of view may be indicated by a view cone in the interactive control. In other embodiments, a marker in the first region that represents a feature (e.g., restaurant or business) can be moved (e.g., dragged) to a different location in the overhead representation. As the marker is moved, the street view perspective is updated to track the location of the marker. These features provide a more user-friendly experience when navigating or editing maps in conjunction with a street view perspective.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Overview

Figure 1:
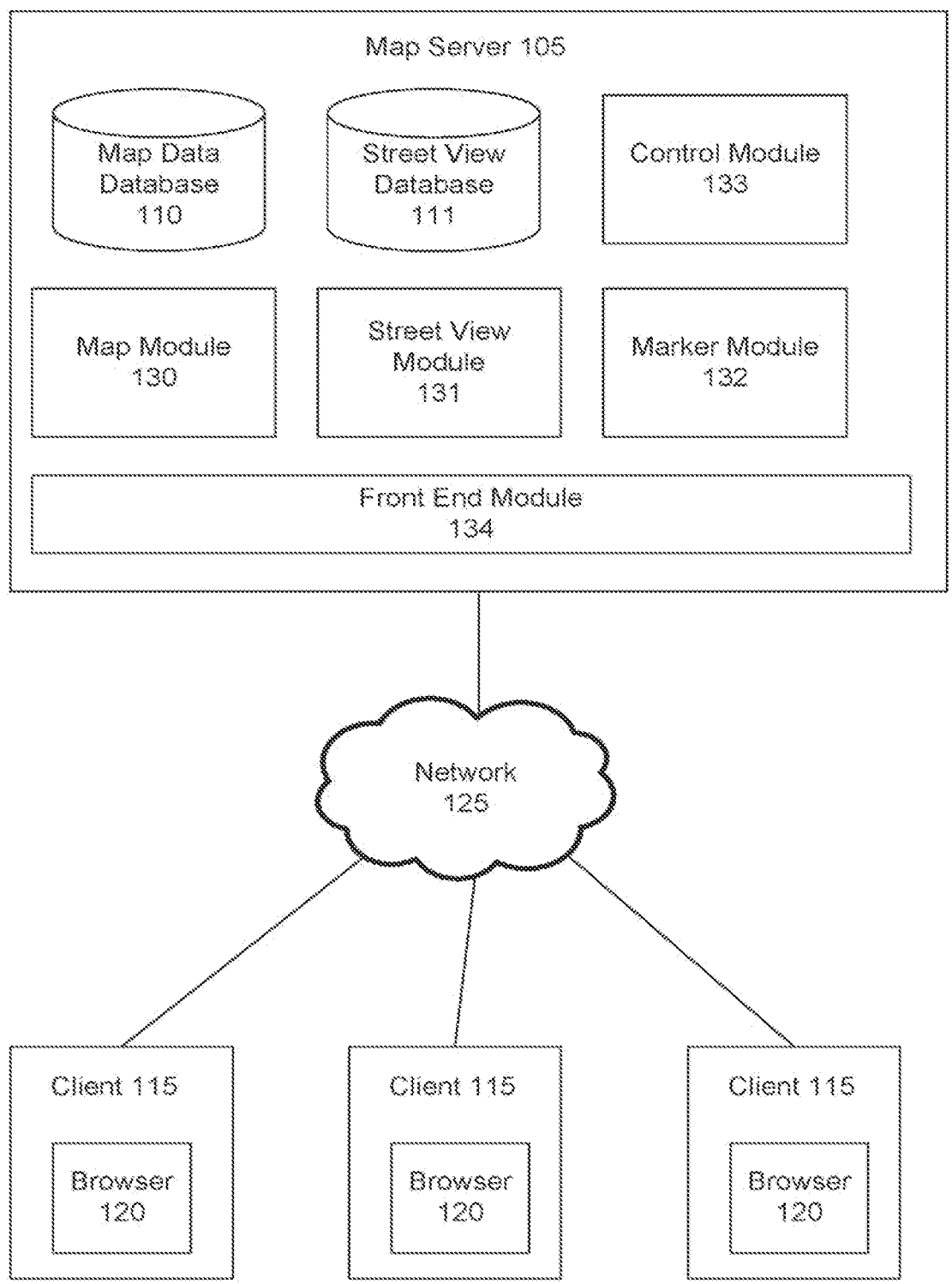
FIG. 1 is block diagram of a computing environment for a map system according to one embodiment.

FIG. 1 is a block diagram that illustrates a computing environment for a map system, according to one embodiment. As shown in FIG. 1, the computing environment includes a map server 105 connected to a number of clients 115 through a network 125. The map server 105 includes functionality for integrating a map with a street view. The map server 105 generates a user interface that includes one region for displaying a map and another region for displaying a street view. In one embodiment, an interactive control on the map is used to control the perspective of the street view. In some embodiments, a field of view of the street view is represented in the appearance of the interactive control. In other embodiments, the street view tracks the position of a marker on the map as the marker is moved around the map.

Through the specification, various embodiments are described by reference to street maps and street level views for purposes of clarity. However, the principles described herein are applicable to any user interface that integrates an overhead representation with a street view perspective. For example, a street map is just one example of an overhead representation, and a street level view is just one example of a street view perspective. In other embodiments, for example, the overhead representation may be a floor plan for a building and the street view perspective may be an interior view of the building from a specific location in the floor plan.

In one embodiment, the map server 105 is implemented as a server class computer comprising a CPU, memory, network interface, peripheral interfaces, and other well known components. As is known to one skilled in the art, other types of computers can be used which have different architectures. The server 105 can be implemented on either a single computer, or using multiple computers networked together. The server 105 is also adapted to execute computer program modules for providing functionality described herein. As used herein, the term "module" refers to computer program logic used to provide the specified functionality. Thus, a module can be implemented in hardware, firmware, and/or software. In one embodiment, program modules are stored in a non-transitory computer-readable storage medium (e.g. RAM, hard disk, or optical/magnetic media) and executed by a processor or can be provided from computer program products that are stored in non-transitory computer-readable storage mediums.

As shown in FIG. 1, the map server 105 includes a map data database 110, a street view data base 111, a front end module 132, a map module 130, and a street view module 131. In general, functions described in one embodiment as being performed on the server side can also be performed on the client side in other embodiments if appropriate. In addition, the functionality attributed to a particular component can be performed by different or multiple components operating together.

The map data database 110 includes map data for features (e.g., roads, parks, bodies of water, buildings, restaurants, hospitals, businesses) that can be used to generate a digital map. For example, the map data may include location information (e.g., GPS coordinates, latitude and longitude) and other attribute information (e.g., name, size, shape) for various features. The street view database 111 includes images of a variety of locations at points of view at approximately street level (e.g., near the height of a human observer). Each image is associated with a geographical location (e.g., GPS coordinates, etc) and a directional orientation so that 360-degree panoramic views can be created from sets of images. The street view images can include actual photographs or still images captured at many geographical locations throughout the world. For example, the images may have been captured with a vehicle-mounted camera that is elevated above the ground. The street view images can also include computer generated renderings, using 3D modeling techniques, as well as analysis and integration of photographs. Images may exist only for discrete points in the world such that not all points of view can be re-created.

A map data database 110 and street view database 111 are illustrated as being stored in server 105. Alternatively, many other configurations are possible. The database 110 and 111 do not need to be physically located within server 105. For example, the databases can be stored in a client 115, in external storage attached to server 105, or in network attached storage. Additionally, there may be multiple servers 105 that connect to a single database 110 or 111.

The map module 130 accesses the map data stored in the map data database 110 to generate a map. A map is a visual representation of a particular area of the world as viewed from an overhead viewpoint. The map may be a two-dimensional (2D) representation, a two and a half dimensional (2.5D) representation or a three dimensional (3D) representation. Additionally, the map may include features such as roads, buildings, businesses, other features that are commonly shown on maps.

The control module 133 generates an interactive control, which is a visual indicator that can be overlaid onto the map. The interactive control has a position and orientation that can be adjusted by a user of the client 115 that interacts with the map. The interactive control is operable to synchronize the map generated by the map module 130 with the street view generated by the street view module 131, as explained below in conjunction with FIG. 2-3, and thereby helps to provide a real time integration of the map with a street view. In some embodiments, the appearance of the interactive control is modified to graphically illustrate the field of view shown in the street view.

The marker module 132 generates markers, which are a type of interactive visual indicator. Markers represent specific features in the map and may be overlaid on the map and/or street view. For example, the position of a marker may represent the location of a particular restaurant or business. Markers can be positioned by a user of a client 115 that interacts with the map, and markers are also synchronized with the street view generated by the street view module 131. Markers are explained in conjunction with FIG. 4.

The street view module 131 accesses the images in the street view database 111 to generate a street view for display in a street view window. The street view is synchronized to the position and orientation of the interactive control and/or the position of the marker. In one embodiment, the street view represents the point of view of a camera or person located in the real world at the position denoted by the interactive control that is facing in the direction denoted by the interactive control. When a user of the client 115 adjusts the interactive control or markers, the street view module 131 receives the changes and automatically updates the street view to reflect the appropriate changes.

The front end module 134 generates a user interface that includes at least two concurrently displayed regions: a region for the map and interactive control and another region for the street view. The regions may be, for example, different regions within the same window or separate windows within the same interface. The front end module 134 also handles communications with the client 115. The front end module outputs the user interface (e.g. as HTML or other information) to the client device 134 for display to a user of the client 115 device. As used here, "displaying" is meant to include either direct or indirect display of information. The front end module 132 also receives user input information from the clients 115 that includes information about user inputs that search, navigate, or edit the map and street view. The user input information is relayed to the various modules (130-133) of the map server 105 for updating the maps, street views, interactive controls, and markers.

In one embodiment, a client 115 executing a browser 120 connects to the map server 105 via the network 125 to access a map and/or to make changes to features in the map. The network includes but is not limited to any combination of a LAN, MAN, WAN, mobile, wired or wireless network, a private network, or a virtual private network. While only three clients 115 are shown in FIG. 1, in general very large numbers (e.g., millions) of clients 115 are supported and can be in communication with the map server 105 at any time. In one embodiment, the client 115 can be implemented using any of a variety of different computing devices, some examples of which are personal computers, digital assistants, personal digital assistants, cellular phones, mobile phones, smart phones and laptop computers.

The browser 120 may include any application that allows users of clients 115 to access web pages on the World Wide Web. Suitable applications include, but are not limited to GOOGLE CHROME, MICROSOFT INTERNET EXPLORER, NETSCAPE NAVIGATOR, MOZILLA FIREFOX, and APPLE SAFARI. The browser 120 is capable of displaying a map and receiving user inputs that navigate through or make changes to the map. Alternatively, the maps can be accessed by a standalone program separate from the browser 120, such as an ANDROID or IPHONE application that is designed for accessing maps.

The browser 120 allows a user of the client 115 to access and view maps and street views from the map server 105 via a user interface provided by the front end module 132. Through the interface, a user can adjust the interactive control and markers with a user input such as a keyboard, mouse, or touch screen input. The user input is then provided to the map server 120 for updating the information displayed at the client 115 device.

Interface for Integrating Map View and Street View

Figure 2:
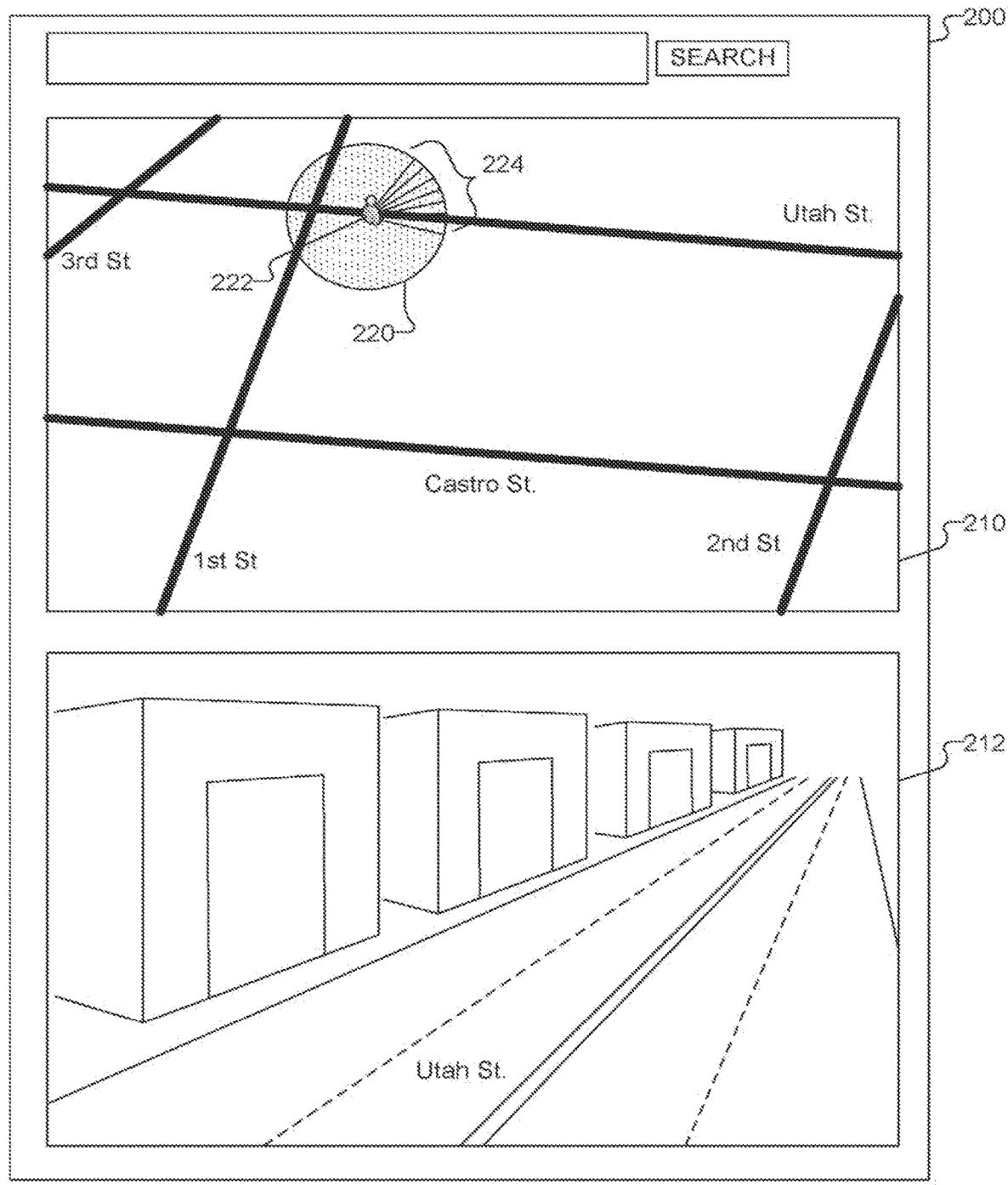
FIG. 2 is a user interface for integrating a map with a street view according to one embodiment.

FIG. 2 is a user interface 200 for integrating a map with a street view according to one embodiment. As shown, the user interface 200 includes a map view region 210 and a street view region 212 that are concurrently displayed as vertical split regions. In other embodiments the arrangement of the two regions may be different. For example, the regions may be of different sizes or shapes. As another example, in a preview mode, the street view region 212 may be displayed as a small preview region in a corner of a larger map view region 210, and the user can switch between the preview mode and the split view mode.

The map view region 210 includes a 2D overhead view of several streets and their intersections. Other features that may also be displayed in the map of the map view region 210 include buildings, parks, restaurants, etc. (not shown). In other embodiments, the map view region may include other representations of a map, such 2.5D representation, a 3D representation, a terrain representation, or a satellite image.

The map view region 210 includes an interactive control 220 that is used to synchronize the map view region 210 with the street view region 212. The interactive control is a visual indicator that has both a position and an orientation. The position of the interactive control 220 is indicated by a "pegman" 222, an icon indicating the point of view for the street view region 212, at the center of the interactive control 220. For example, the interactive control 220 is shown here to be located on Utah St. The orientation of the interactive control 220 is indicated by the direction of the cone 224 extending from the pegman 222 at the center of the interactive control 220. In other words, the cone 224 represents the direction in which the pegman 222 is looking. For example, the interactive control 220 is shown here to be oriented in a north-east direction towards the north side of Utah St. In other embodiments, the interactive control may have a different appearance than what is shown in FIG. 2.

The street view region 212 includes a street level view that is synchronized with the interactive control 224 of the map view region 210. Specifically, the visualization shown in the street view region 212 corresponds to the point of view as seen from the position of the pegman 222 in the direction in which the pegman 222 is facing. For example, the pegman 222 is located east of 1$^{st}$ street on Utah Street and faces to the north side of the Utah Street. Thus, the point of view of a person or camera located on Utah Street and facing the north side of Utah Street is shown in the street view region 212.

Figure 3A:
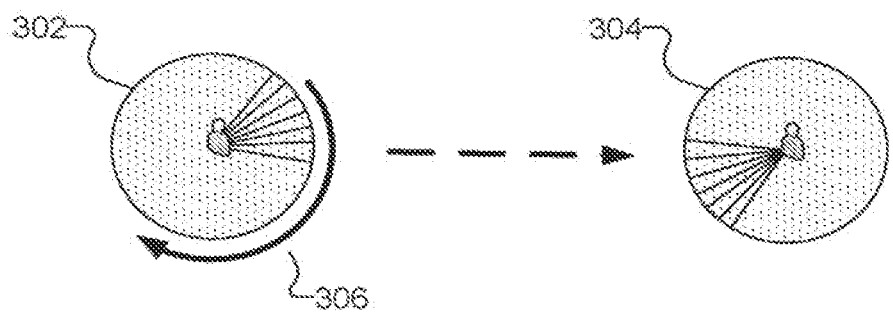
FIG. 3A illustrates rotating an interactive control according to an embodiment.

The interface 200 is interactive and accepts inputs from a user for navigating the displayed map. Specifically, a user can interact with the interactive control 220 in at least two ways: by rotating the control 220 or dragging the control 220 to a new position. FIG. 3A illustrates rotating an interactive control according to an embodiment. Interactive control 302 represents a control before it is rotated 306 and interactive control 304 represents the control after it is rotated 306. A user can rotate the control 302, for example, by selecting the cone of the interactive control 302 with a mouse or touch screen input and dragging the cone to a new orientation.

Figure 3B:
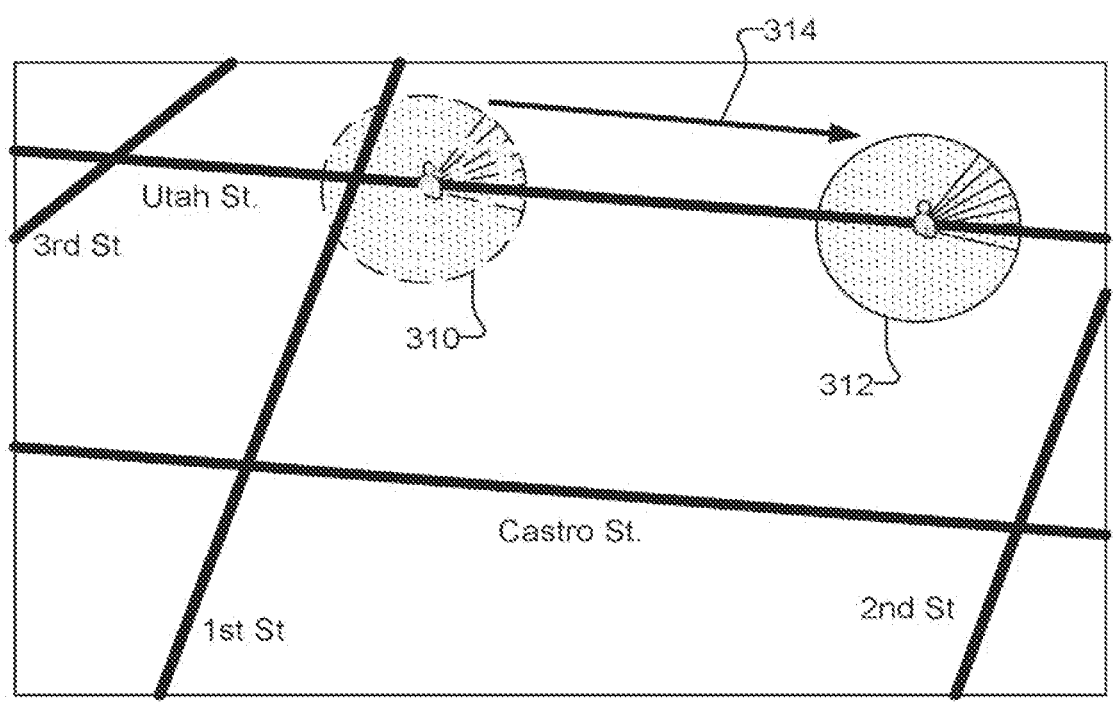
FIG. 3B illustrates dragging an interactive control according to an embodiment.

FIG. 3B illustrates dragging an interactive control to a new position according to an embodiment. Interactive control 310 represents a control before it is dragged 314 and interactive control 312 represents the control after it is dragged 314. A user can drag the control 310, for example, by selecting the center or rim of the interactive control 310 with a mouse or touch screen input and dragging the control 310 across the map to a new position.

Referring back to FIG. 2, as the interactive control 220 is being rotated to its new orientation and/or dragged to its new position, the street view region 212 is updated to track the orientation and position of the interactive control 220. For example, if the interactive control 220 is rotated from its current orientation facing the north side of Utah St. towards the south side of Utah St., the street view region 212 would also pan from the north side of Utah St to the south side of Utah St to simulate the motion of a person turning their head from one side of the street to the other side of the street. As another example, if the interactive control 220 is dragged from its current position on the west end of Utah St. to the east end of Utah St., the street view region 212 would also follow the control 220 to simulate the motion of a person walking or driving down the street. By allowing a user to control the display of the street view region by rotating and dragging a control in the map view region, the user is provided with an intuitive navigational experience. As the control 220 is synchronized with the street view region 212, any changes in the street view region 212 also cause the position and orientation of the control 220 to be updated.

In one embodiment, the interactive control 220 can also be tilted up and down which causes a corresponding change in the street view region 212. Tilting the control 220 adds an additional vertical orientation dimension to the user interface 200. For example, tilting the interactive control 220 up causes the image in the street view region 212 to tilt upwards towards the sky, simulating the motion of a person looking upwards. Tilting the control 220 down causes the image in the street view region 212 to tilt downwards towards the ground, simulating the motion of a person looking downwards. In one embodiment, the appearance of the interactive control 220 also changes to indicate that it is tilted. For example, the interactive control may appear tilted and have a shadow when the control is tilted.

The field of view of the perspective in the street view region 212 is also represented by the angular size of the view cone 224 of the interactive control 220. A field of view may also be known as an angle of view, and refers to the part of the scene that is visible in the street view region 212. For example, if the field of view in the street view region 212 is 60 degrees, then the size of the cone 224 is also approximately 60 degrees. The interactive control 220 may also be partially transparent so that the region of the map covered by the field of view is readily visible to a user. In one embodiment, the street view region 212 has a constrained field of view, such as a view of 45-60 degrees. In other embodiments, the street view region 212 may have a smaller or larger field of view. Representing the field of view in the appearance of the interactive control 220 helps the user maintain a sense of how the image in the street-view region 212 relates to features shown in the map view region 200 without becoming disoriented.

In one embodiment, features that are known to be in the field of view of the street view region 212 are projected onto the map view region 210. Projecting features onto the map view region 210 can include marking the features, for example, in a visually distinctive manner such as highlighting or coloring. In one embodiment, features in the street view region 212 are identified from previously stored associations between the street view images and certain features. For example, if a particular street view image is known to include a portion of the Empire State Building, then the Empire State Building will be highlighted in a distinctive color, outline, or other graphical attribute in the map view region 210.

Figure 4:
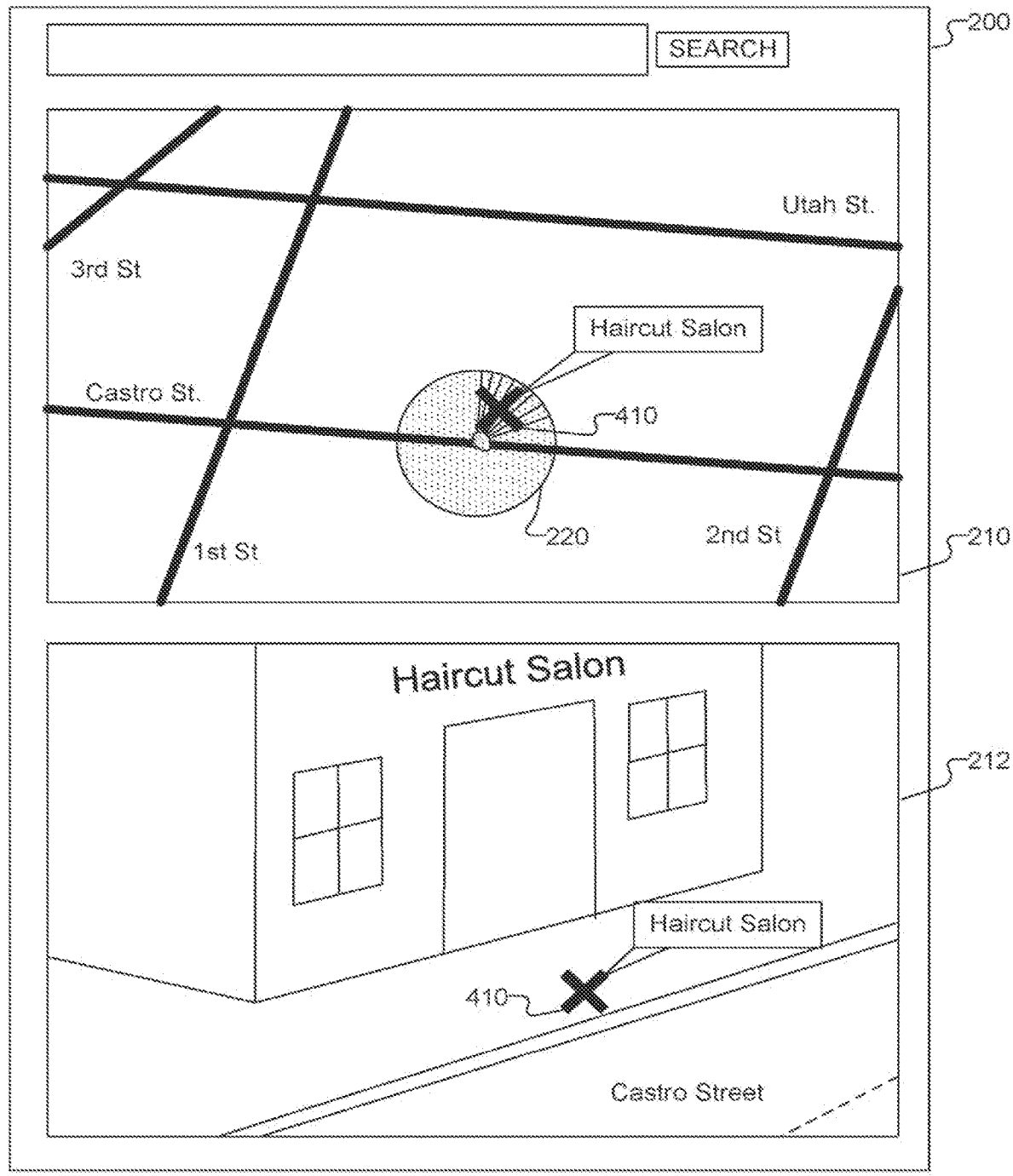
FIG. 4 is a user interface for integrating a map with a street view according to one embodiment.

Referring now to FIG. 4, illustrated is a user interface 200 for integrating a map view with a street view according to one embodiment. Specifically, FIG. 4 illustrates how a user can edit a map by adjusting the position of a marker in the map. The interface 200 in FIG. 4 is similar to the interface in FIG. 3, but the interface now includes visual markers 410 in both the map view region 210 and the street view region 212. Both visual markers 410 are linked to each other and represent the location of the business "Haircut Salon." A user can move the marker 410 around the map view region 210 to place the marker 410 in a new position, for example, to correct the location of the marker 410 if it is in the wrong place. The user input may be, for example, a mouse, or touch screen input that selects the marker 410 in the map view region 210 and drags it to a new location. As the marker 410 is being dragged around the map view region 210, the perspective in the street view region 212 is updated to track the position of the marker 410.

The street view region 212 may track the position of the marker 410 by showing how the marker 410 would appear from a street location that is closest to the marker. The street view region 212 also shows how the marker 410 would appear from the point of view of a person or camera facing the marker 410. For example, if the marker 410 were moved in the map view region 210 from its position on Castro St. to a location on Utah St., the street view region 212 would also be updated to follow the marker 410 as it is dragged to its new location. Eventually, the street view region 212 would show the new location for the marker 410 on Utah St. as viewed from the closest point on Utah St. where an image is available. By following the location of the marker 410 in the street view region 212, the user can quickly and accurately determine if the marker 410 is placed at the correct location by referring to the display in the street view region 212.

In other embodiments, the marker 410 may have an appearance that is different from that shown in FIG. 4. Additionally, the map view region 210 may include an interactive control 220 that was previously described in conjunction with FIG. 2. As mentioned, the interactive control 220 is synchronized with the street view region 212. When the street view region 212 follows the position of the marker 412, the interactive control 220 is also updated to correctly reflect the perspective shown in the street view region 212.

Process Flow

Figure 5:
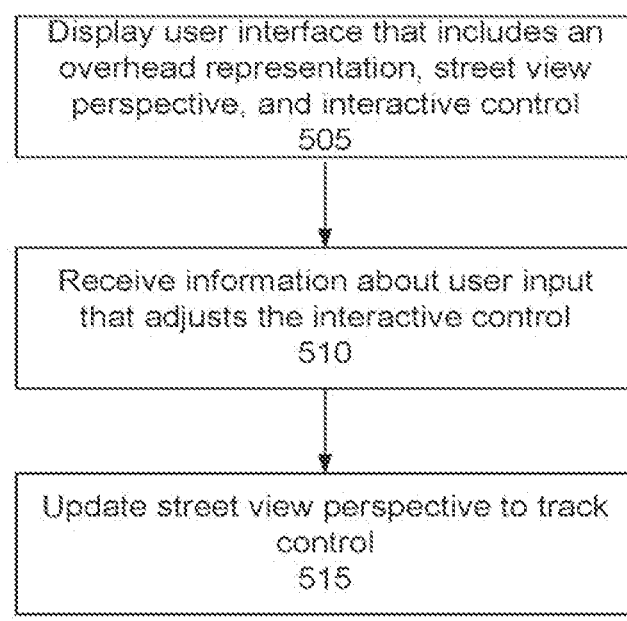
FIG. 5 is a method for integrating a map with a street view according to one embodiment.

FIG. 5 illustrates a method for integrating an overhead representation (e.g., map view) with a street view perspective, according to an embodiment. In one embodiment, the steps in FIG. 5 may be performed by the various modules of the map server 105. In step 505, a user interface is displayed that is includes at least two regions. An overhead representation of an area is output for display in one region of a user interface. For example, the overhead representation may be a street map or a floor-plan for a building. An interactive control is also output for display in the same region of the user interface as the overhead representation. The interactive control has both a position and an orientation with respect to the overhead representation. A street view perspective of the area is output for display in another region of the user interface. The street view perspective represents the point of view from the position denoted by the interactive control in the direction denoted by the interactive control. The field of view of the street view perspective may also be reflected in the appearance of in the interactive control, for example, with a partially transparent view cone.

In step 510, information about a user input that adjusts the interactive control is received. For example the user input may adjust the interactive control by rotating, dragging, or tilting the control. In step 515, the street view perspective is updated to track the changes to the interactive control. If the user input rotates or tilts the interactive control, the street view perspective is updated to track the orientation of the interactive control as the control is being rotated. If the user input drags the interactive control to a new position, the street view perspective is updated to track the position of the interactive control as the control is being moved.

Figure 6:
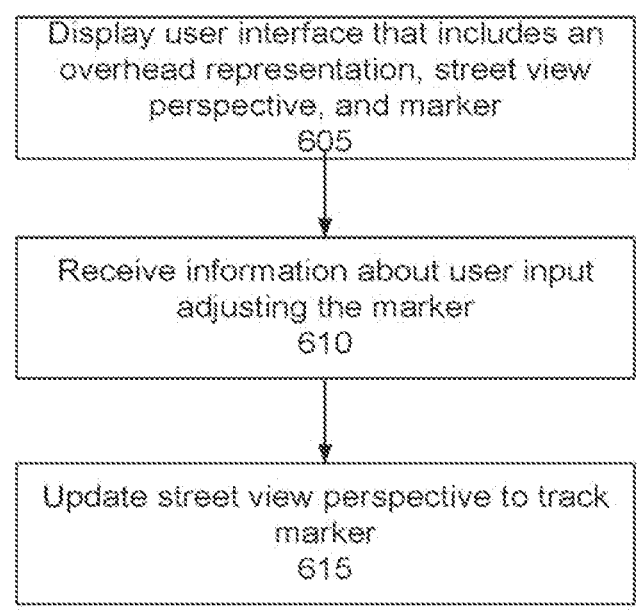
FIG. 6 is a method for integrating a map with a street view according to one embodiment.

FIG. 6 illustrates a method for integrating an overhead representation (e.g., map view) with a street view perspective, according to an embodiment. In step 605, a user interface is displayed that includes at least two regions. An overhead representation and one or more markers are output for display in one region of the interface. A marker represents a feature in the overhead representation, for example, a restaurant or business. A street view perspective of the area is output for display in another region of the user interface. The street view perspective has a point of view that faces a position denoted by the visual marker. In step 610, information about a user input that drags the marker around the overhead representation to a new position is received. As the marker is dragged to its new position, the street view perspective is updated to track the position of the marker as it is being moved.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "identifying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs of integrating an overhead representation with a street view perspective through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method, comprising:
   outputting, for display in a first region of a user interface, an overhead view including a map of an area;
   outputting, for display in a second region of the user interface, a street view perspective of the area;
   outputting a visual indicator for display on the map in the overhead view, wherein the visual indicator includes a view cone extending from the visual indicator in a direction which corresponds to a point of view displayable in the street view perspective, the point of view corresponding to a position of the visual indicator and a directional orientation of the view cone;
   outputting a movable object for display on the map in the overhead view, wherein the movable object is separate and independent from the visual indicator and the view cone; and
   receiving a user input with respect to the map in the overhead view changing a position of the movable object to another location in the map causes the street view perspective to be changed so that the point of view displayed in the street view perspective tracks with the change in position of the movable object via the user input.

2. The computer implemented method of claim 1, wherein receiving the user input with respect to the map in the overhead view changing the position of the movable object to another location in the map is independent from a selection of the visual indicator and comprises moving the movable object displayed in the map in the overhead view from a first position in the overhead view to a second position in the map in the overhead view.

3. The computer implemented method of claim 2, wherein the movable object is a marker, and
   the user input comprises moving the marker from the first position in the map in the overhead view to the second position in the map in the overhead view via a drag operation.

4. The computer implemented method of claim 1, wherein moving the movable object from a first position in the map in the overhead view to a second position in the map in the overhead view causes the position of the visual indicator to be moved to the second position, and a directional orientation of the view cone is updated to have an orientation which faces toward the second position.

5. The computer implemented method of claim 1, wherein outputting, for display in the first region of the user interface, the overhead view including the map of the area includes:
   marking features of a point of interest which appears in the overhead view of the area in a visually distinctive manner when the point of interest at least partially appears in the street view perspective of the area.

6. The computer implemented method of claim 5, wherein marking features of the point of interest which appears in the overview view of the area in the visually distinctive includes at least one of highlighting, outlining, or coloring the features.

7. The computer implemented method of claim 6, wherein the point of interest includes one or more buildings.

8. The computer implemented method of claim 1, wherein:
   the movable object includes a first visual marker overlaid on the map in the overhead view of the area; and
   the method further comprises outputting, for display in the second region of the user interface, a second visual marker overlaid on the street view perspective of the area, the second visual marker and the first visual marker being linked to one another, at a same geographic position in the area, and representing a location of a feature in the area.

9. The computer implemented method of claim 8, wherein receiving the user input with respect to the map in the overhead view changing the position of the movable object to another location in the map comprises selecting the first visual marker and moving the first visual marker from a first geographic position to a second geographic position in the map in the overhead view of the area, thereby causing the second visual marker overlaid on the street view perspective of the area to be moved from the first geographic position to the second geographic position; and changing the street view perspective to track movement of the first visual marker comprises changing the street view perspective to have a point of view that faces the second visual marker at the second geographic position.

10. The computer implemented method of claim 1, wherein
the visual indicator includes a circular-shaped portion with a center and an outer rim,
the center of the visual indicator includes an icon which indicates the position of the visual indicator, and
the view cone extends from the icon to the outer rim of the circular-shaped portion.

11. The computer implemented method of claim 10, wherein the view cone is transparent.

12. The computer implemented method of claim 1, further comprising receiving a further user input selecting the view cone of the visual indicator that adjusts the directional orientation of the view cone by rotating the visual indicator by dragging the view cone to a new directional orientation; and
updating the street view perspective to track the directional orientation of the view cone as the visual indicator is rotated via the further user input.

13. A computing system, comprising:
one or more memories configured to store instructions; and
one or more processors configured to execute the instructions stored in the one or more memories to perform operations, the operations including:
outputting, for display in a first region of a user interface, an overhead view including a map of an area;
outputting, for display in a second region of the user interface, a street view perspective of the area;
outputting a visual indicator for display on the map in the overhead view, wherein the visual indicator includes a view cone extending from the visual indicator in a direction which corresponds to a point of view displayable in the street view perspective, the point of view corresponding to a position of the visual indicator and a directional orientation of the view cone;
outputting a movable object for display on the map in the overhead view, wherein the movable object is separate and independent from the visual indicator and the view cone; and
receiving a user input with respect to the map in the overhead view changing a position of the movable object to another location in the map causes the street view perspective to be changed so that the point of view displayed in the street view perspective tracks with the change in position of the movable object via the user input.

14. The computing system of claim 13, wherein
receiving the user input with respect to the map in the overhead view changing the position of the movable object to another location in the map is independent from a selection of the visual indicator and comprises moving the movable object displayed in the map in the overhead view from a first position in the overhead view to a second position in the map in the overhead view.

15. The computing system of claim 14, wherein
the movable object is a marker, and
the user input comprises moving the marker from the first position in the map in the overhead view to the second position in the map in the overhead view via a drag operation.

16. The computing system of claim 13, wherein:
the movable object includes a first visual marker overlaid on the map in the overhead view of the area; and
the operations further comprise outputting, for display in the second region of the user interface, a second visual marker overlaid on the street view perspective of the area, the second visual marker and the first visual marker being linked to one another, at a same geographic position in the area, and representing a location of a feature in the area.

17. The computing system of claim 16, wherein
receiving the user input with respect to the map in the overhead view changing the position of the movable object to another location in the map comprises selecting the first visual marker and moving the first visual marker from a first geographic position to a second geographic position in the map in the overhead view of the area, thereby causing the second visual marker overlaid on the street view perspective of the area to be moved from the first geographic position to the second geographic position; and
changing the street view perspective to track movement of the first visual marker comprises changing the street view perspective to have a point of view that faces the second visual marker at the second geographic position.

18. One or more non-transitory computer-readable media that store instructions that, when executed by one or more processors, cause the one or more processors to perform operations, the operations comprising:
outputting, for display in a first region of a user interface, an overhead view including a map of an area;
outputting, for display in a second region of the user interface, a street view perspective of the area;
outputting a visual indicator for display on the map in the overhead view, wherein the visual indicator includes a view cone extending from the visual indicator in a direction which corresponds to a point of view displayable in the street view perspective, the point of view corresponding to a position of the visual indicator and a directional orientation of the view cone;
outputting a movable object for display on the map in the overhead view, wherein the movable object is separate and independent from the visual indicator and the view cone; and
receiving a user input with respect to the map in the overhead view changing a position of the movable object to another location in the map causes the street view perspective to be changed so that the point of view displayed in the street view perspective tracks with the change in position of the movable object via the user input.

* * * * *